INVENTOR
BENJAMIN R. BARNARD
GUSTAV MAASS
BY Robert M. Dunning
ATTORNEY

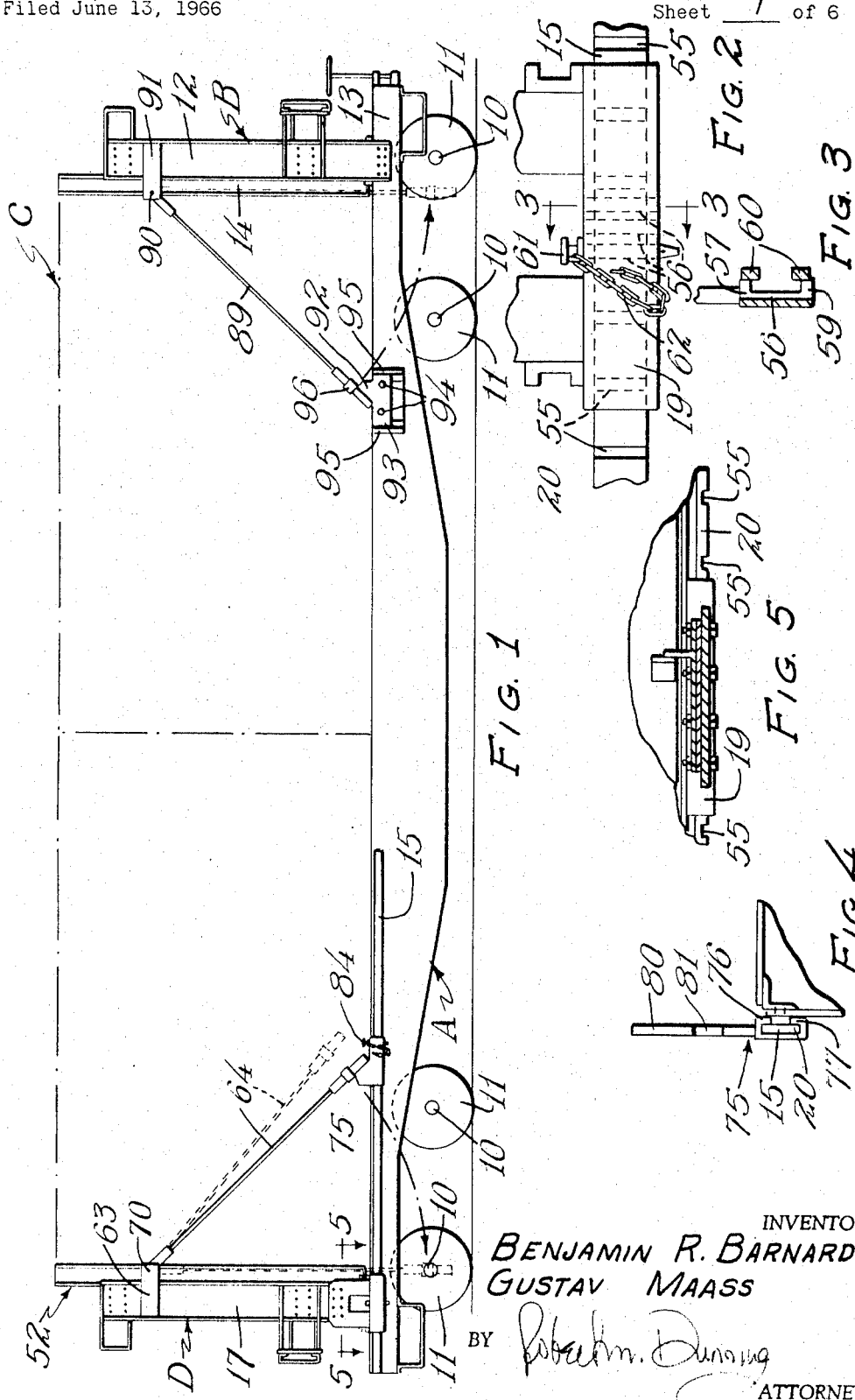

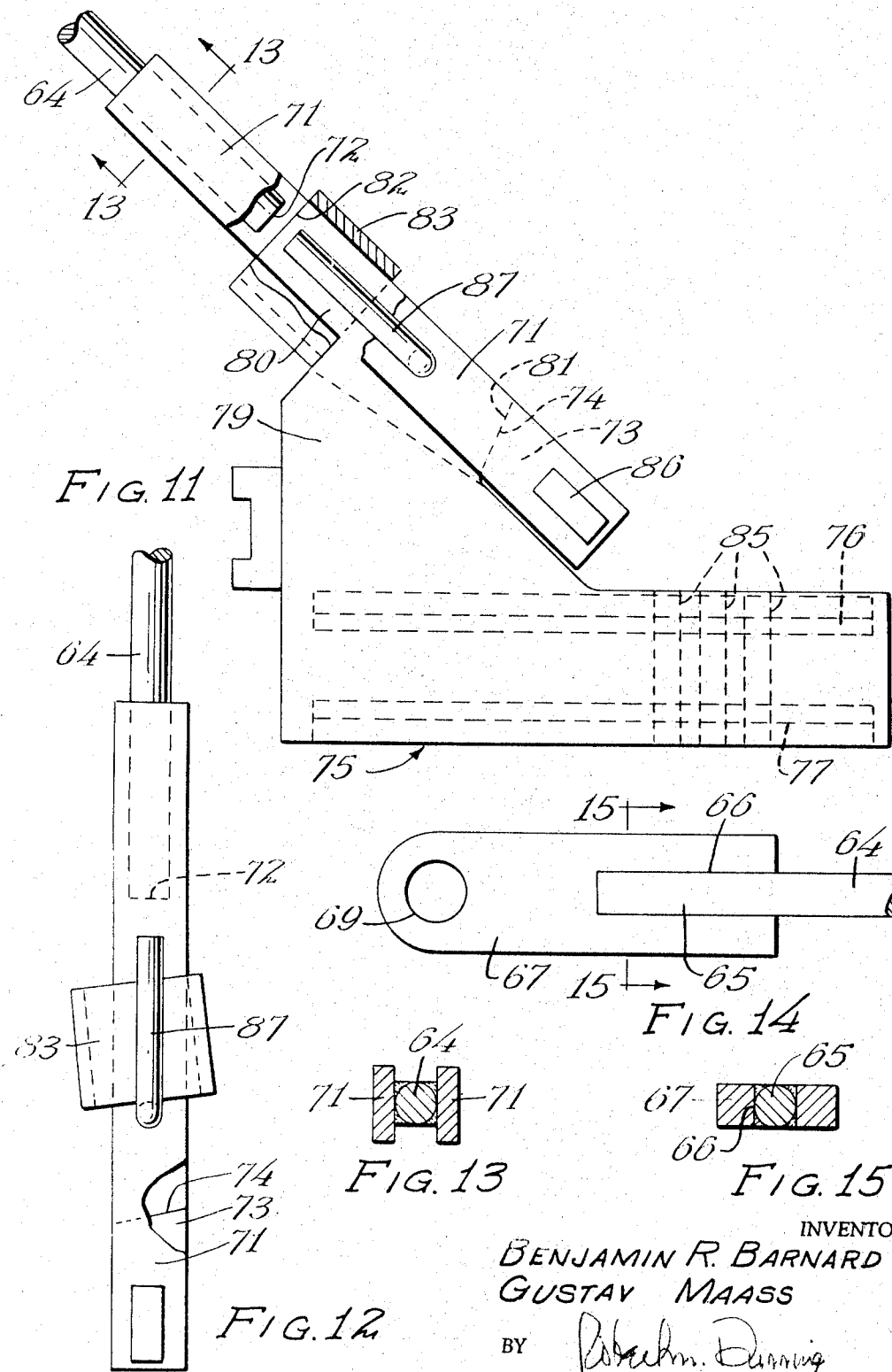

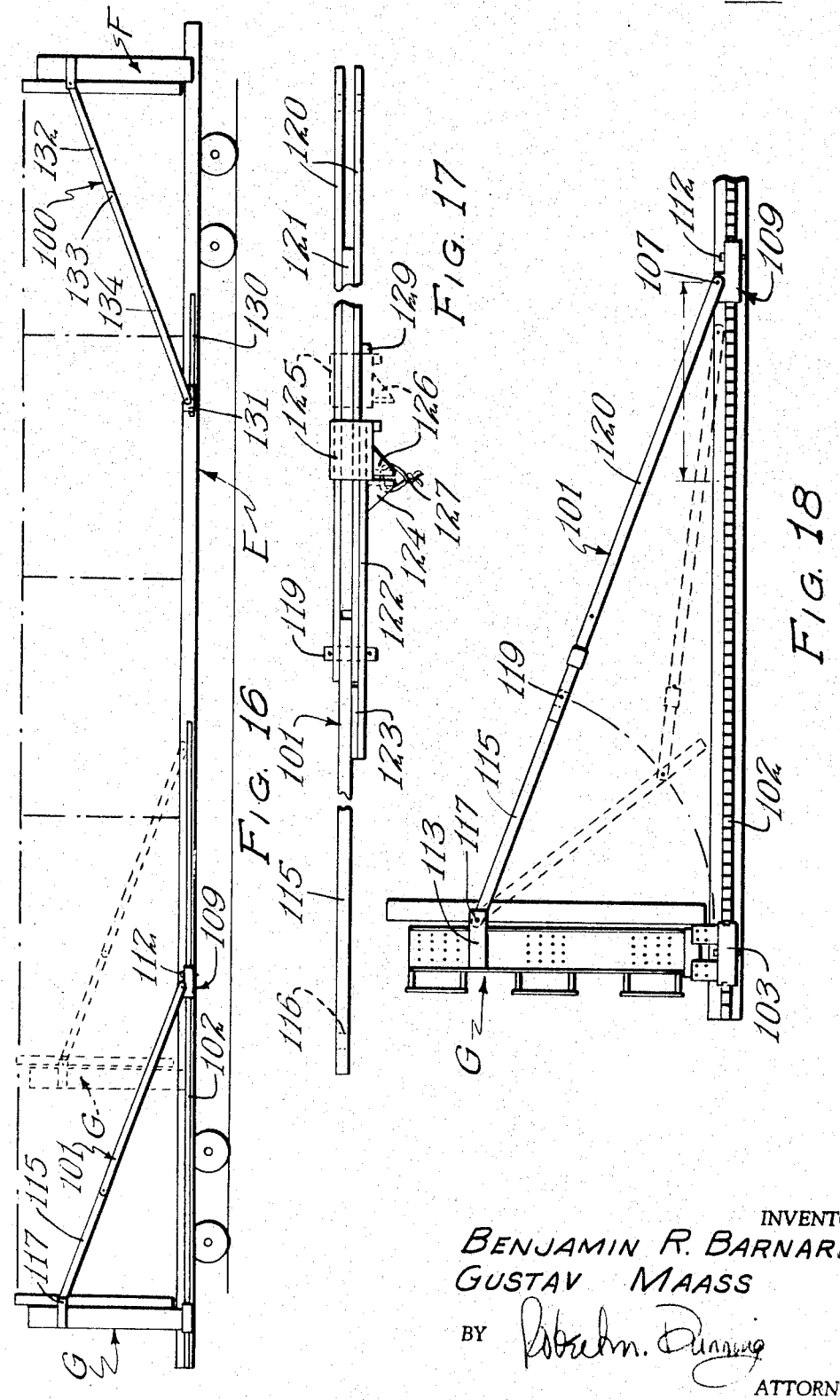

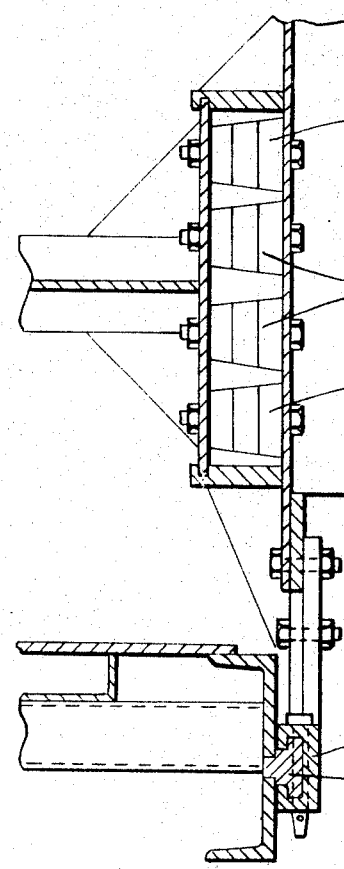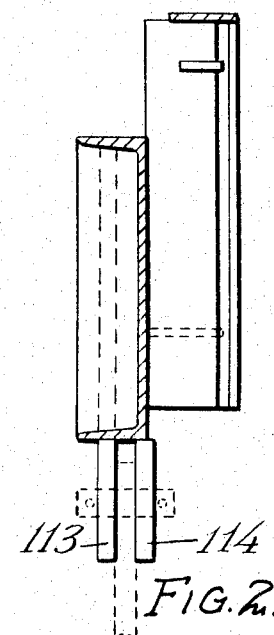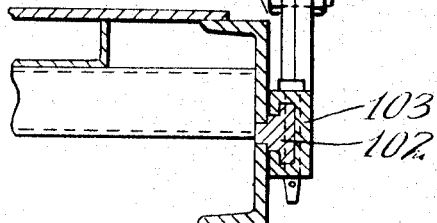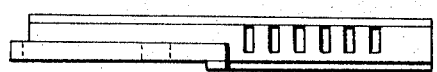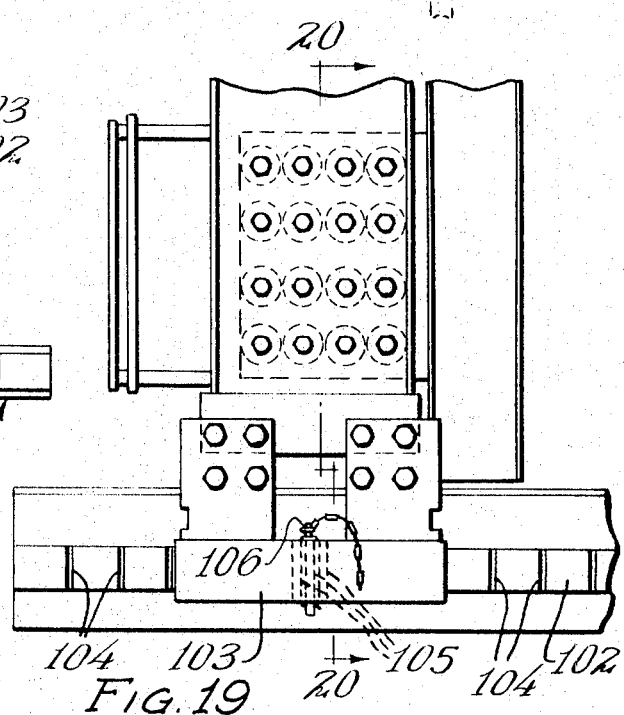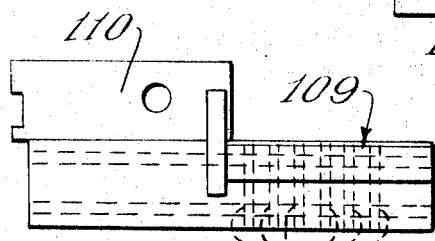

United States Patent Office 3,451,357
Patented June 24, 1969

3,451,357
MOVABLE SHOCK-ABSORBING BULKHEADS
Benjamin R. Barnard and Gustav Maass, Minneapolis, Minn., assignors to St. Paul Foundry & Manufacturing Company, St. Paul, Minn., a corporation of Minnesota
Filed June 13, 1966, Ser. No. 557,191
Int. Cl. B61d 17/06, 45/00
U.S. Cl. 105—376                              9 Claims

ABSTRACT OF THE DISCLOSURE

The invention discloses a railroad flat car having a fixed bulkhead at one end and an adjustable bulkhead at the other end. The movable bulkhead is supported by rails extending along opposite sides of the car. The movable bulkhead is reinforced by braces connecting an upper portion of each bulkhead side to a slide on the rail.

---

Figure 6:
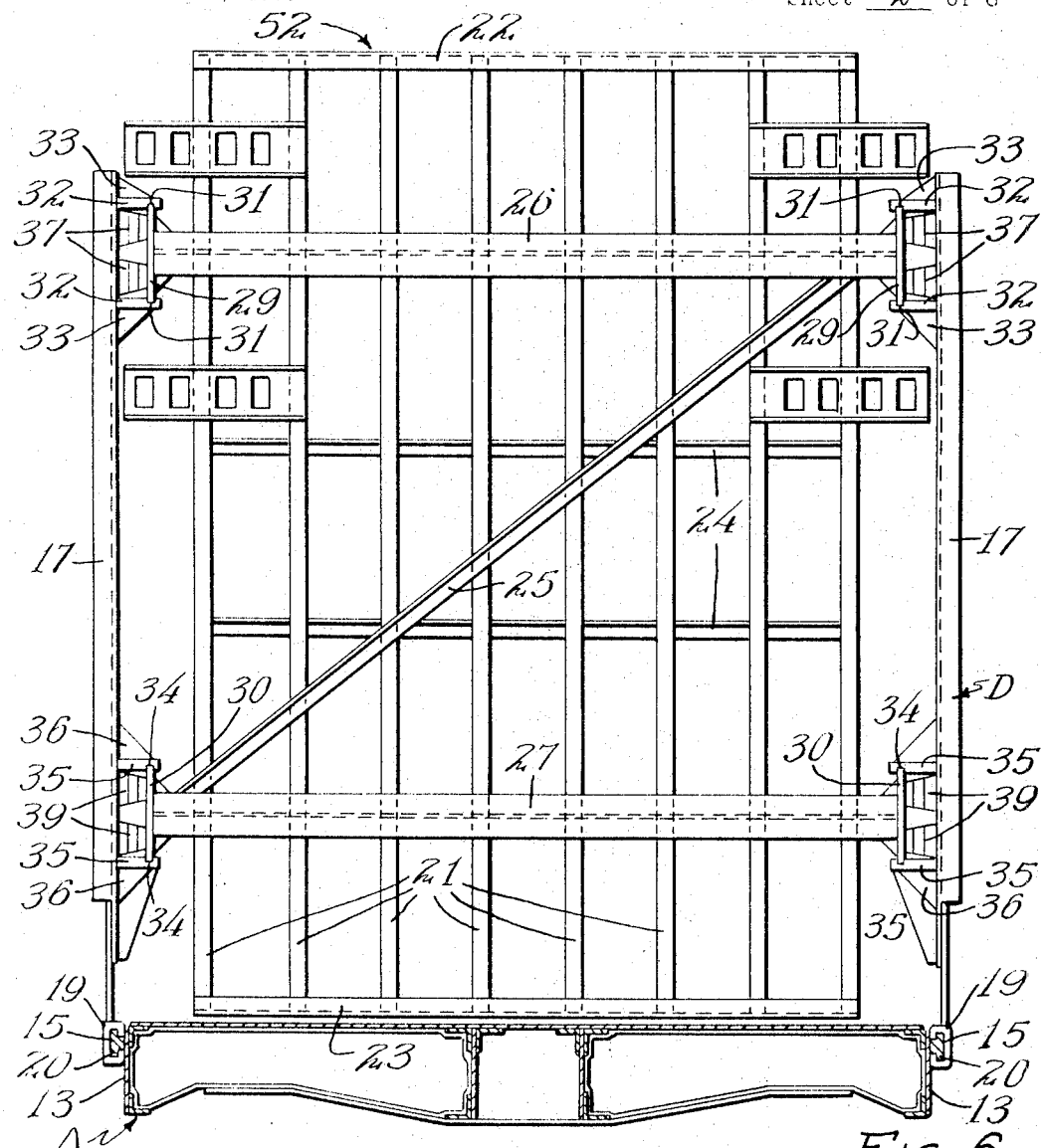

This invention relates to an improvement in railroad car bulkheads and deals particularly in a bulkhead useful in preventing any substantial longitudinal movement of a load placed upon a railroad car.

Certain types of goods are most conveniently shipped upon flatcars because of the simplicity with which the product may be mounted on, and removed from, a car of this type. For example, elongated flat sheets of siding may be loaded onto a flatcar by means of a lift truck of similar device, and may be readily unloaded by a similar device. The entire loading and unloading operation takes a small fraction of the time which would be required to load a similar product in an enclosed freight car. The biggest problem in shipping such goods on flatcars lies in the provision of a bulkhead capable of preventing the sliding of the load during shipment without destruction to itself and the product.

An object of the present invention resides in the provision of a freight car having, in preferred form, a fixed bulkhead and a movable bulkhead. In loading the car, the load is placed against the fixed bulkhead. The movable bulkhead may be moved into engagement with the other end of the load, and firmly secured in place. Each bulkhead includes a pair of upright parallel sides called the bulkhead jambs and a framework called the bulkhead panel supported between said upright sides and resiliently mounted thereupon. Shifting of the load is capable of moving the bulkhead panel longitudinally of the car due to the resilient mounting. The resilience of the mounting tends to return the bulkhead panel and load to its original position.

A further feature of the present invention resides in the provision of a railroad car of the type described including diagonally extending braces extending from the upper portion of each bulkhead jamb to a point near the center of the car, the braces extending diagonally. A simple means is provided for securing the lower ends of these braces to the sides of the railroad car so that the braces may be swung out of the way then the car is being loaded or unloaded.

A further feature of the present invention resides in the provision of a rail extending longitudinally of the railroad car on each side thereof for supporting the movable bulkhead. The rail not only supports the bulkhead jamb members which support the bulkhead panel, but also support the anchoring means to which the braces are attached.

A further feature of the present invention resides in the provision of a simple and effective means of locking the bulkhead in place upon the rail, and also for unlocking the brace anchoring means in an adjusted position on the rail. The rail is provided with equally spaced vertical notches in its outer surface, and the portions of the jamb and brace anchor which slide on the rails are provided with vertical grooves, any of which may be moved into opposed relation with one of the grooves in the rail. A pin is located in the opposed matching grooves to hold the two parts from relative longitudinal movement.

These and other objects and novel features of the present invention will be more clearly and fully set forth in the following specification and claims.

Figure 7:
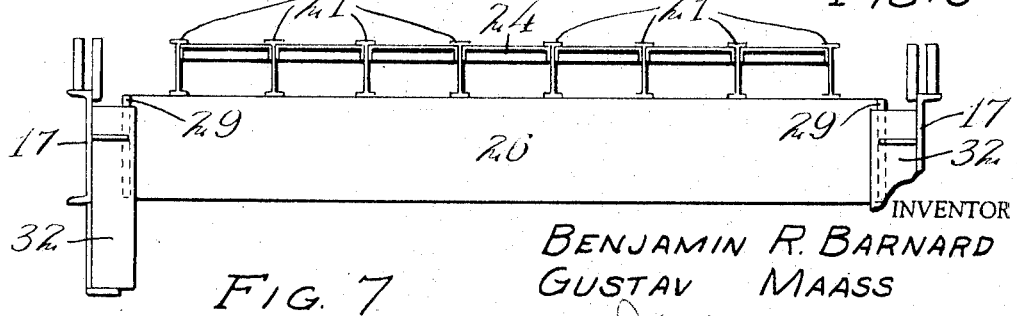
Figure 8:
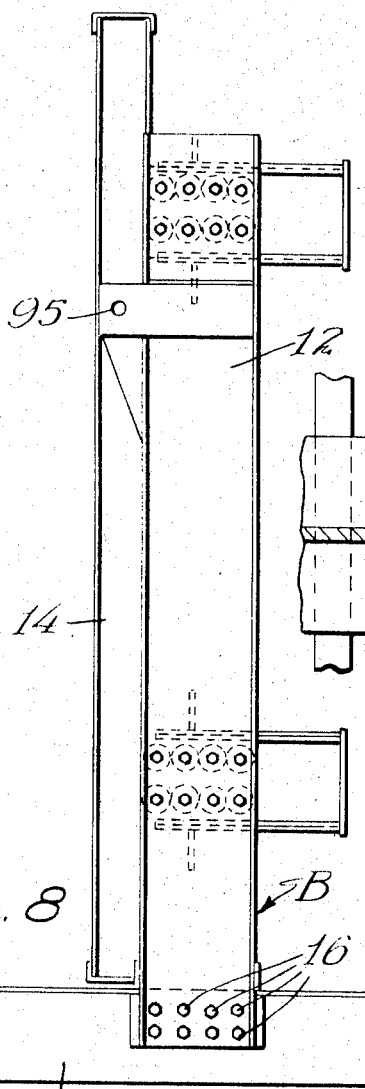
Figure 9:
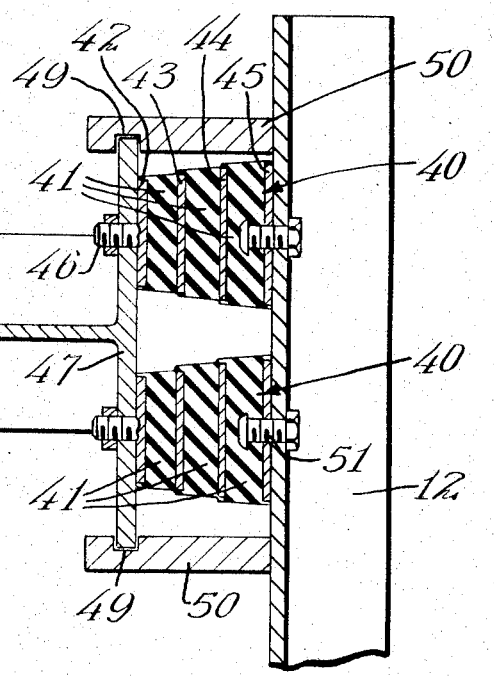
Figure 10:
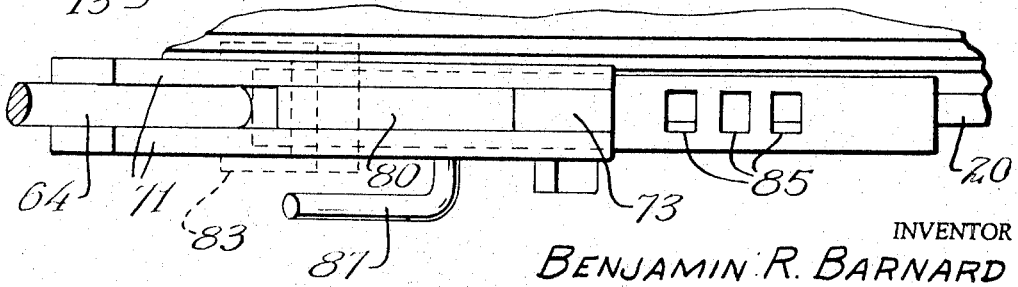

In the drawings forming a part of the specification
FIGURE 1 is a side elevational view of a flatcar showing the bulkheads mounted thereupon.
FIGURE 2 is an elevational view of a detailed portion of the movable bulkhead support.
FIGURE 3 is a section on the line 3—3 of FIGURE 2.
FIGURE 4 is a vertical sectional view showing an end of the movable brace.
FIGURE 5 is a sectional view, the position of the section being indicated by the line 5—5 of FIGURE 1.
FIGURE 6 is a vertical sectional view through the car body and illustrating the movable bulkhead.
FIGURE 7 is a plan view of the bulkhead illustrated in FIGURE 6.
FIGURE 8 is a side elevational view of the fixed bulkhead.
FIGURE 9 is a vertical sectional view through a pair of cushioning members used in connecting the bulkhead to its supporting frame.
FIGURE 10 is a plan view showing the slide supporting the end of the brace on the supporting rail.
FIGURE 11 is a side elevational view of the slide indicated in FIGURE 10.
FIGURE 12 is a side view of the detachable end of the brace in detached position.
FIGURE 13 is a sectional view through the brace, the position of the section being indicated by the line 13—13 of FIGURE 11.
FIGURE 14 is a plan view of the upper end of the brace.
FIGURE 15 is a cross-sectional view through the brace end, the position of the section being indicated by the line 15—15 of FIGURE 14.
FIGURE 16 is a side elevational view of the bulkhead used in conjunction with a railroad car of greater length than that shown in the previous figures.
FIGURE 17 is a plan view of the brace used in FIGURE 16.
FIGURE 18 is an elevational view of the movable bulkhead and brace, showing the manner in which the brace may be swung downwardly toward an out-of-the-way position.
FIGURE 19 is a side elevational view of the lower portion of the movable bulkhead shown in FIGURE 18.
FIGURE 20 is a vertical sectional view, the position of the section being indicated by the line 20—20 of FIGURE 19.
FIGURE 21 is an elevational view of the upper end of the movable bulkhead.
FIGURE 22 is a sectional view on the line 22—22 of FIGURE 21.
FIGURE 23 is a plan view of the slide used to connect the lower end of the brace to the side rail.
FIGURE 24 is a side elevational view of the slide indicated in FIGURE 23.

The flatcar is indicated in general by the letter A. In view of the fact that the structure of the car and its support forms no part of the present invention, the car A is shown somewhat diagrammatically. The flatcar is supported by axles such as 10 on which rail-engaging wheels 11 are mounted. The car A illustrated in FIGURE 1 is of a 42-foot length. A car more than twice that long is shown in FIGURE 16, as will be described.

A fixed bulkhead B is supported adjacent one end of the car. The fixed bulkhead B is not shown in any great detail, as fixed bulkheads have been previously produced. For the purpose of this invention, it may be said that the bulkhead B includes a pair of vertical frame members 12 bolted or otherwise secured to the sides such as 13 of the car A to extend vertically therefrom. The two opposed frame sides 12 support a bulkhead 14 which is engageable with an end of the load, the load being indicated in broken outline by the letter C. Preferably, the bulkhead member 14 is resiliently supported between the frame sides 12. The movable bulkhead D is slidably supported at the opposite end of the car A, the bulkhead D being supported by a pair of generally T-shaped rails 15 the base portions of the rails being welded or otherwise secured to the sides 13 of the car A.

Both of the bulkheads B and D are quite similar in construction, the main difference lying in the fact that the frame members 12 of the fixed bulkhead B are bolted to the frame sides 13 as indicated at 16 in FIGURE 8 of the drawings. As is indicated in FIGURE 6 of the drawings, the supporting frame jambs 17 of the movable bulkhead D are supported by slides 19 which are generally C-shaped in cross-section so as to extend about the vertical flange 20 of each rail. Each bulkhead includes a series of vertical beams 21 connected at their upper and lower ends by transverse channels 22 and 23, and further connected by transversely extending braces 24 and a diagonal brace 25. The vertical beams are also connected by upper and lower transverse connecting members 26 and 27 which project beyond the group of vertical beams 21. The ends of the transverse member 26 support a pair of vertical parallel plates 29 while the ends of the transversely extending member 27 support a pair of vertical parallel plates 30. The vertical plates 29 are slidable in opposed grooves 31 in horizontally extending plates 32 which are held in right-angular relation to the frame sides 17 by reinforcing gusset plates 33. The parallel vertical plates 30 are similarly slidably supported in opposed grooves 34 in vertically spaced parallel plates 35 reinforced by gusset plates 36 and supported by the frame sides 17.

The plates 29 and 30 are connected to the frame side members 17 by resilient cushioning members 37 and 39 respectively. These cushioning members are identical to the cushioning members 40 illustrated in FIGURE 9 of the drawings, the cushioning members 40 being used to support the relatively fixed bulkhead 14. The cushioning members 40 are shown as including a series of slabs 41 of resilient material sandwiched between a series of metal plates 42, 43, 44 and 45. The disk is shown as being secured by the bolt 46 to the slidable plate 47 which corresponds to the plates 29 and 30. The plates 47 are slidable in opposed grooves 49 in vertically spaced plates 50 anchored to the frame side 12. The disk 45 of each cushioning member is secured by a bolt 51 to the frame side 12. The resilient members 37 and 39 thus provide a resilient support for the movable portion 52 of the movable bulkhead.

As indicated in FIGURES 2 and 5 of the drawings, a series of longitudinally spaced rectangular grooves 55 are provided in the outer surface of the vertical flange 20 of each rail 15. The slide 19 is provided with a series of three vertical grooves 56 in its inner surface, and the upper and lower flanges 57 and 59 of each slide is provided with apertures 60 communicating with the grooves 56. The arrangement is such that when any of the grooves 56 is in opposed registering relation with a groove 55 in rail flange 20, a pin 61 of rectangular cross-section may be slipped through the apertures 56 and engaged in the opposed grooves to hold the slide 19 in fixed relation on the rail. The arrangement is such that the slide may be held in virtually any position along the rail. As an example, the grooves 55 in the rail are spaced apart a distance of 4½ inches between centers. The three grooves 56 in the inner surface of the slide 19 are spaced apart on centers of an inch and a half. Thus the movable bulkhead D may be anchored very close to any desired position. A chain of other flexible connecting means 62 secures the pin 61 to the slide 19 to avoid any chance of losing the pin.

A strap 63 is secured to each frame side 17 of the movable bulkhead D. A brace arm 64 has its upper end 65 welded or similarly secured in a slot 66 of a pivot plate 67 as indicated in FIGURES 14 and 15 of the drawings. The pivot plate 67 is apertured as indicated at 69 to accommodate a pivot bolt 70 connecting the brace arm 64 to the frame of the movable bulkhead.

As indicated in FIGURES 11, 12 and 13 of the drawings, a pair of spaced parallel plates 71 are welded to opposite sides of the brace arm 64 at the lower end thereof, the plates 71 extending well beyond the end 72 of the brace arm 64. A spacer block 73 is welded between the ends of the arms 71, the block 73 having an inclined end 74.

A brace slide indicated in general by the numeral 75 is slidably supported upon the rail 15 for movement longitudinally thereof. As indicated in FIGURE 4 of the drawings, the inner side of each slide 75 is provided with a pair of angular flanges 76 and 77 which make the lower body portion of the slide generally C-shaped in cross-section to engage about the vertical flange 20 of the rail 15. A generally L-shaped projection 80 which is designed to fit between the bars 71 between the end 72 of the brace arm 64 and the end 74 of the spacer block 73. The L-shaped extension 80 has its lower end 81 in abutting relation with the inclined end 74 of the spacer block 73, and has its upper end 82 in closely spaced relation to the lower end 72 of the brace arm 64. A rectangular retainer sleeve 83 is slidably supported for movement over the plates 71 and, when in the position illustrated in FIGURE 11, acts to hold the extension 80 between the spaced plates 71. Thus when the sleeve 83 is in the position indicated in FIGURE 11 of the drawings, the brace arm 64 is held fixed to the extension 80 of the slide 75.

The slide 75 is held from longitudinal movement relative to the flange 20 of the rail 15 by means of a pin of rectangular section indicated in FIGURE 1 by the number 84 which extends through one of the vertical apertures 85 through the slide 75, and through one of the matching grooves 55 in the rail flange 20. In other words, the slide 75 is held from longitudinal movement in the same manner as the bulkhead slide 19 previously described, the slots 85 being spaced much closer together than the slots 55 in the rail flange 20 to provide a relatively close adjustment.

The brace arm 64 may be detached and swung downwardly into vertical position below the pivot 70. This is accomplished by sliding the sleeve 83 upwardly along the plates 71 until the sleeve clears the end of the L-shaped extension 80. The angular engagement 74 between the lower end of the brace arm and the extension 80 facilitates a disengagement of the two parts. Ears 86 are provided on one or more of the plates 71 so that the brace arm may be engaged by a lever to facilitate the engagement of the parts. A hook-shaped retainer 87 is provided on one of the plates 71 to hold the rectangular ring 83 from disengagement from the brace arm.

The brace 89 connecting the fixed bulkhead B to the sides of the railroad car A is similar to the brace arm 64. The brace arm 89 is pivotally connected at 90 to a strap 91 on each bulkhead side 12, and is connected at its lower end to the extension 92 of a bracket 93 which is similar in general to the slide 75, but which is bolted to the frame side as indicated at 94 and held from longitudinal movement by engagement between angle brackets 95. The brace arm 89 slidably supports a sleeve 96 by means of which the brace arm 89 may be connected to the bracket extension 92 in the manner which will be described. In the arrangement illustrated, it is essential that the brace arms 64 and 89, together with the end portions attached thereto, do not exceed in length the distance between the pivots 70 and 90 and the surface of the ground. This permits the brace arms 64 and 89 to swing into vertical position in a manner to allow the loads of product to be inserted or removed from the sides of the car by a suitable lift truck or other similar means.

The structure which has been described is designed for use with a railroad car of a conventional length, such as 42 feet. A similar structure has been successfully used on a railroad car which is 89 feet in length, the car E being capable of supporting about 2½ times the capacity of the car A. The general arrangement of both cars is the same. Naturally, the movable and fixed bulkheads of the longer car are more heavily built and are capable of withstanding considerably greater strain longitudinally of the car E. However, the general arrangement of parts is quite similar.

In general, the railroad car illustrated at E in FIGURES 16 through 24 of the drawings simulates that of the railroad car E in general, but the parts have been increased in strength to take care of the greater weight involved. In other words, the fixed bulkhead F which is illustrated in FIGURE 16 is quite similar to the fixed bulkhead B which has been described, and the movable bulkhead G is quite similar to the previously described movable bulkhead D. One of the main differences, as will be illustrated in FIGURE 18 of the drawings, lies in the fact that 3 sets of resilient cushioning members on either side of the bulkhead have been used in place of the two vertically spaced sets on the bulkhead D. One of the main points of difference between the two structures lies in the fact that the brace 100 which connects the fixed bulkhead F to the sides of the car E, and the brace 101 which connects the movable bulkhead G to the sides of the car E are somewhat longer than the previously described base arms in order to withstand the strain. As a result, these braces are too long to fold into a vertical position in the manner of the brace arms 64 and 89, and are accordingly jointed in order to clear the sides of the car.

The railroad car E is provided with an elongated rail 102 extending along each side of the car, one of which as indicated in FIGURES 16 and 18 of the drawings. The bulkhead G is supported by slide 103 indicated in FIGURES 19 and 20 of the drawings, and which is slidable longitudinally of the rail. As is indicated in FIGURE 20 of the drawings, the slide 103 is substantially C-shaped in cross-section to slide upon the generally T-shaped rail 102. In view of the fact that this arrangement is similar to that previously described, the structure will not be discussed in great detail.

The rail 102 is provided with spaced vertical notches 104 for use in holding the slide 103 in an adjusted position. The slide 103 is provided with a series of relatively closely spaced grooves 105 which are in opposed relation to the rail grooves 104. A pin 106 which is of generally rectangular cross-sectional shape, may be inserted in any pair of opposed grooves 104, 105 to hold the slide 103 in an adjusted position.

The brace 101 is pivotally connected at its lower end at 107 to a slide 109 indicated in FIGURES 23 and 24 of the drawings. A pivot plate 110 is mounted on the upper surface of the slide 109 through which the pivot 107 extends. The slide 109 is provided with a closely spaced series of vertical grooves all of which are in the inner surface of the slide and which may register with the grooves 104 of the rail 102. A pin such as 112 may be used to hold the slide 109 in fixed relation to the rail 102. A strap 113 is mounted on each side of the bulkhead G. Actually, as indicated in FIGURES 21 and 22 of the drawings, the strap 113 actually includes a pair of spaced plates 113 and 114 between which the brace is pivoted. The brace 101 is shown in FIGURE 17 as including an elongated bar 115 which is apertured at 116 to accommodate a pivot 117 connecting the brace 101 to the bulkhead. The upper portion 115 of the brace 101 is pivotally connected at 119 to a pair of spaced brace arms 120 held in properly spaced relation by a suitable spacer arm such as 121. An extension 122 of the arm 115 is secured in spaced parallel relation to the arm 15 by means of a spacer and block 123. The extension 122 supports a laterally extending lug 124.

A sleeve 125 is slidably supported on the spaced arms 120 and is slidable over the arm extension 122 when in the position indicated in full lines in FIGURE 17 of the drawings. The sleeve 125 is provided with a lug 126 which is engaged against the lug 124 and which may be secured thereto by a suitable tie such as 127. When in the position shown in FIGURE 17 of the drawings, the two brace members are held in longitudinal alignment. When the sleeve 125 is in the position shown in dotted outline, against the stop pin 129 on one of the arms 120, the two arms may pivot relative to one another as is indicated in dotted outline in FIGURE 18 of the drawings.

The arrangement is such that by removing the pin holding the slide 109 in fixed position, removing the tie 127 and sliding the sleeve 125 into the position shown in dotted outlines in FIGURE 17 of the drawings, the upper portion 115 of the brace arm 111 may be swung downwardly to a vertical position, the slide 109 being correspondingly moved to the left as indicated in FIGURE 18 of the drawings. Thus the corresponding side of the car is open so that the contents may be removed. The brace 100 connecting the fixed bulkhead F to the side of the car E is similarly arranged. A rail 130 is provided on each side of the car, and a slide 131 similar to the slide 109 is mounted thereon. The upper portion 132 of the brace 100 which is pivotally connected at 133 to the lower portion 134 of the brace arm may be swung down so that the two portions of the brace are at right angles, opening up the side of the car so that the contents may be insered or removed. The brace 111 is essentially the same as the brace 101 which has been described.

In accordance with the patent statutes, we have described the principles of construction and operation of our improvement in railroad car bulkheads, and while we have endeavored to set forth the best embodiment thereof, we desire to have it understood that changes may be made without departing from the spirit of our invention.

We claim:

1. A railroad car bulkhead for use in combination with an elongated car body having parallel longitudinal sides, including
    an elongated car body,
    rails on opposite sides of said body extending longitudinally thereof,
    a pair of opposed bulkhead sides slidably supported on said rails and extending upwardly therefrom,
    a bulkhead frame slidably supported between said bulkhead sides and movable longitudinally of said car,
    resilient connecting means connecting said bulkhead sides and said bulkhead frame, and
    means adjustably anchoring said bulkhead sides in fixed relation to said rails.

2. The structure of claim 1 and including brace means hingedly connected to said bulkhead sides, slide means slidable on said rails, means connecting said brace means to said slide means, and means for adjustably securing said slide means to said rails.

3. The structure of claim 2 and in which said brace means are detachably connected to said slide means, and are of a length not exceeding their points of pivotal attachment to said bulkhead sides and the surface of the ground.

4. The structure of claim 2 and in which said brace means include joints intermediate their ends which are pivotally connected on axes parallel to the pivot axes connecting said brace means to said bulkhead sides and in which said brace means are pivotally connected to said slide means along axes parallel to the other said axes.

5. A railroad car including an elongated body
a rail extending in fixed relation on the opposite sides of said body,
an upright bulkhead supported by said rails to slide longitudinally of said body,
means for securing said bulkheads in fixed relation to said rails,
a slide slidably supported on each of said rails,
means for securing said slides in an adjusted fixed relation to said rails,
a pair of braces secured on aligned pivots to opposite sides of said bulkhead near the upper extremities thereof,
means detachably securing said braces to said sides,
each said slide including an upwardly extending plate including an extension extending toward the points of pivot connecting said braces to said bulkhead,
said braces each having a longitudinally extending slot extending therethrough adapted to accommodate a corresponding plate extension, and
said means detachably securing said braces including a sleeve slidably supported by each said brace and extending over said brace and plate extension to hold the same assembled.

6. A railroad car including an elongated body,
a rail extending in fixed relation on the opposite sides of said body,
an upright bulkhead supported by said rails to slide longitudinally of said body,
means for securing said bulkheads in fixed relation to said rails,
a slide slidably supported on each of said rails,
means for securing said slides in an adjusted fixed relation to said rails,
a pair of braces secured on aligned pivots to opposite sides of said bulkheads near the upper extremities thereof,
means detachably securing said braces to said slides,
said rails being provided with spaced vertical notches in their outer surfaces and said slides being provided with a vertical aperture providing a notch in the inner surface thereof in opposed relation to said notched rail surface and in which said means for securing said slide in fixed relation comprises a pin extending into one of said rail notches and into an opposed notch in said slide.

7. The structure of claim 6 and in which said notches are rectangular, and said pin is of rectangular cross-section.

8. A railroad car including an elongated body,
a rail extending in fixed relation on the opposite sides of said body,
an upright bulkhead supported by said rails to slide longitudinally of said body,
means for securing said bulkheads in fixed relation to said rails,
a slide slidably supported on each of said rails,
means for securing said slides in an adjusted fixed relation to said rails,
a pair of braces secured on aligned pivots to opposite sides of said bulkhead near the upper extremities thereof,
means detachably securing said braces to said slides,
said bulkhead including a pair of upright supports slidably supported by said rails, and a bulkhead frame between said supports and resiliently connected thereto.

9. The structure of claim 8 and in which said bulkhead frame is slidably supported between said upright supports, and said resilient connection, resiliently restrains said bulkhead frame from movement relative to said supports.

References Cited

UNITED STATES PATENTS

| | | | |
|---|---|---|---|
| 1,304,023 | 5/1919 | Coleman | 105—374 |
| 1,745,982 | 2/1930 | Copony | 105—368 |
| 2,826,156 | 11/1958 | Hall. | |
| 2,978,993 | 4/1961 | Hall | 105—374 |
| 2,982,230 | 5/1961 | Chapman. | |
| 3,089,437 | 5/1963 | Hendricker | 105—411 |
| 3,200,772 | 8/1965 | Moorhead. | |

DRAYTON E. HOFFMAN, Primary Examiner.

U.S. Cl. X.R.

105—369, 374